(12) United States Patent
Topping et al.

(10) Patent No.: US 12,517,077 B2
(45) Date of Patent: Jan. 6, 2026

(54) ELECTRONIC DEVICE AND METHOD OF PRODUCTION THEREOF

(71) Applicant: Power Roll Limited, Sunderland (GB)

(72) Inventors: Alexander John Topping, Sunderland (GB); Nicholas Kasch, Sunderland (GB); Fabrice Dierre, Sunderland (GB)

(73) Assignee: Power Roll Limited, Sunderland (GB)

( * ) Notice: Subject to any disclaimer, the term of this patent is extended or adjusted under 35 U.S.C. 154(b) by 155 days.

(21) Appl. No.: 18/271,752

(22) PCT Filed: Feb. 7, 2022

(86) PCT No.: PCT/GB2022/050314
§ 371 (c)(1),
(2) Date: Jul. 11, 2023

(87) PCT Pub. No.: WO2022/171987
PCT Pub. Date: Aug. 18, 2022

(65) Prior Publication Data
US 2024/0060926 A1 Feb. 22, 2024

(30) Foreign Application Priority Data
Feb. 10, 2021 (GB) .................................... 2101831

(51) Int. Cl.
*G01N 27/22* (2006.01)
(52) U.S. Cl.
CPC .................................. *G01N 27/227* (2013.01)
(58) Field of Classification Search
CPC ........ G01N 27/227; G01N 27/22; H01G 4/06; H01G 7/00
See application file for complete search history.

(56) References Cited

U.S. PATENT DOCUMENTS

| 4,893,214 A | 1/1990 | Nishiwaki et al. |
| 5,393,401 A * | 2/1995 | Knoll .................... G01N 27/414 257/253 |
| 2009/0114541 A1 | 5/2009 | Choi et al. |

(Continued)

FOREIGN PATENT DOCUMENTS

| CN | 112240895 A * | 1/2021 | ............. G01N 15/00 |
| GB | 2215846 A | 9/1989 | |

(Continued)

OTHER PUBLICATIONS

English language abstract and machine-assisted English translation for JPS 57-148242 A extracted from espacenet. com database on Jul. 12, 2023, 4 pages.
English language abstract and machine-assisted English translation for WO 2007/124725 A1 extracted from espacenet.com database on Jul. 12, 2023, 9 pages.

(Continued)

*Primary Examiner* — Feba Pothen
(74) *Attorney, Agent, or Firm* — Howard & Howard Attorneys PLLC (57) ABSTRACT

An electronic device and a method of production thereof. The electronic device (100) comprising at least one groove (107) formed in a substrate (101), the at least one groove (107) having a first face (108) and a second face (109) and a cavity (110) therebetween. A portion of the first and second faces (108), (109) are formed from a non-insulating material (102) and wherein the non-insulating material (102) of the first and second faces (108), (109) are electrically separated from one another.

17 Claims, 7 Drawing Sheets

(56) References Cited

U.S. PATENT DOCUMENTS

| | | |
|---|---|---|
| 2011/0045601 A1 | 2/2011 | Gryska et al. |
| 2013/0304397 A1 | 11/2013 | Erlandsson et al. |
| 2019/0088803 A1 | 3/2019 | Topping |
| 2019/0259895 A1 | 8/2019 | Topping |
| 2020/0211788 A1 | 7/2020 | Topping |

FOREIGN PATENT DOCUMENTS

| | | | |
|---|---|---|---|
| GB | 2555009 A | 4/2018 | |
| JP | S57148242 A | 9/1982 | |
| KR | 20130029569 A | 3/2013 | |
| WO | WO-9953287 A2 * | 10/1999 | ......... G01N 33/0031 |
| WO | 2007124725 A1 | 11/2007 | |
| WO | 2017184144 A1 | 10/2017 | |

OTHER PUBLICATIONS

International Search Report for Application No. PCT/GB2022/050314 dated Apr. 29, 2022, 3 pages.

Pernik, Douglas R. et al., "Plastic Microgroove Solar Cells Using CuInse 2 Nanocrystals", ACS Energy Letters, vol. 1, No. 5, Nov. 11, 2016, pp. 1021-1027.

English language abstract and machine-assisted English translation for KR 20130029569 A extracted from espacenet.com database on Jun. 21, 2023, 9 pages.

International Search Report for Application No. PCT/GB2021/053370 dated Mar. 9, 2022, 3 pages.

Sun, Gun-Joo et al., "V-Groove Sn02 Nanowire Sensors: Fabrication and Pt-Nanoparticle Decoration", Nanotechnology, Institute of Physics Publishing, Bristol, GB, vol. 24, No. 2, Dec. 13, 2012, p. 25504.

U.S. Appl. No. 18/268,483, filed Jun. 20, 2023.

* cited by examiner

| Metric | Definition |
|---|---|
| C0 | Initial capacitance value (background level) |
| C5 | Capacitance after depositing a first droplet of analyte of volume V1 |
| C10 | Capacitance after depositing a second droplet of analyte of volume V2 |
| s5 | Signal/Noise Ratio for first droplet of analyte, defined as C5/C0 |
| s10 | Signal/Noise Ratio for first and second droplets of analyte, defined as C10/C0 |
| S | Capacitance Sensitivity after depositing 2 droplets of analyte, defined as (C10-C0) / (V1 +V2) |
| t5 | Time for stabilizing from C0 to C5 (first and second phase response) |
| t10 | Time for stabilizing from C5 to C10 (first and second phase response) |
| td | Time for stabilizing from C10 to C0 after removing analyte (desorption) |

FIG. 5b

| Internal Ref | C0 (nF) | C5 (nF) | C10 (nF) | s5 | s10 | S (nF / uL) | t5 (s) | t10 (s) | td (s) |
|---|---|---|---|---|---|---|---|---|---|
| BLK_IGI | 1.46 | 10.76 | 25.14 | 7.37 | 17.22 | 2.37 | 44.50 | 43.46 | 13.00 |
| D53_1P | 12.4 | 24.5 | 41.1 | 1.98 | 3.31 | 1.66 | 7.00 | 4.28 | 12.00 |

| Internal Ref | C0 (nF) | C5 (nF) | C10 (nF) | s5 | s10 | S (nF / uL) | t5 (s) | t10 (s) | td (s) |
|---|---|---|---|---|---|---|---|---|---|
| BLK_ELF | 0.0453 | 0.536 | 0.852 | 11.83 | 18.81 | 0.03 | 24.06 | 19.70 | 6.66 |

ELECTRONIC DEVICE AND METHOD OF PRODUCTION THEREOF

CROSS-REFERENCE TO RELATED APPLICATIONS

The present application is the National Stage of International Patent Application No. PCT/GB2022/050314 filed on Feb. 7, 2022, which claims priority to and all the benefits of Application No. GB 2101831.2 filed on Feb. 10, 2021, both of which are hereby expressly incorporated herein by reference in their entirety.

This invention relates to an electronic device and a method of production thereof.

BACKGROUND

Electronic devices may be used for providing energy storage. Such devices may be used in conjunction with renewable energy sources. The demand for sources of renewable energy has driven improvements in energy storage. However, the energy density of energy storage devices must be increased and/or the cost of energy storage must be decreased, if renewable energy is going to meet more of the world's energy demand. Thus, there is a need to provide low cost electronic devices for energy storage with increased energy density.

Electronic devices may be used for providing sensors. Sensor devices provide an electrical signal in response to analytes in their environment. For example, certain sensors provide a measurable change in capacitance in response to an analyte, or a chemical group of analytes, due to the specific response of capacitor material to the analyte in question. A drawback of known sensor devices is that the devices are expensive to produce due to their complexity and requirement for specialist materials, or accurate spacing of components.

The present invention aims to mitigate one or more of the disadvantages of existing electronic devices. An object of the invention is to provide an electronic device which is a relatively simple design, so that the device may be manufactured quickly and at low cost.

BRIEF SUMMARY OF THE DISCLOSURE

In accordance a first aspect of the present invention, there is provided an electronic device. The electronic device comprising:
  at least one groove formed in a substrate, the at least one groove having a first face and a second face and a cavity therebetween;
  wherein a portion of the first and second faces are formed from a non-insulating material; and
  wherein the non-insulating material of the first and second faces are electrically separated from one another.

An electronic device having a portion of the first and second faces formed from a non-insulating material improves the accuracy and speed of forming grooves of an electronic device over those formed via a coating process, for example. This is because no additional process is required to provide non-insulating material on the first and second faces of the groove since the first and second faces are formed from the non-insulating material. When the electronic device is in an unfilled state, i.e. when there is no material filling or partially filling the cavity of the groove, the first face and the second face of the groove are electrically separated from one another.

The at least one groove may comprise a first groove and a second groove; wherein a first face of the first groove may be in electrical communication with a second face of the second groove. Thus, voltage can be shared across more than one groove of the electronic device.

Each groove of the at least one groove may be an elongate groove. The elongate groove may extend along a surface of the substrate. In this way, the first and second faces may be first and second elongate faces of the at least one groove.

In examples where the at least one groove comprises a first groove and a second groove, the first groove and second may extend in parallel to each other across a surface of the substrate. Optionally, the first and second groove may extend linearly in parallel to each other.

Each groove of the at least one groove may be an elongate groove extending from a distal end portion of the groove to a proximal end portion of the groove. In this way, the first and second faces may extend from a distal end portion of the groove to a proximal end portion of the groove.

The substrate may comprise a layer of non-insulating material. In this way the layer of non-insulating material forms the portion of the first and second faces formed from the non-insulating material. Stated differently, the portion of the first and second faces formed from a non-insulating material are each formed through the layer of non-insulating material.

Optionally, the substrate may comprise a layer of non-insulating material and a layer of insulating material. The at least one groove may extend through the layer of non-insulating material into the layer of insulating material so that the non-insulating material of the first and second faces are electrically separated from one another. Stated differently, the first and second faces of the groove may be formed in the layer of non-insulating material and a base of the at least one groove may be formed in the layer of insulating material. The base of the at least one groove electrically separates the non-insulating material of the first face of the groove from the non-insulating material of the second face of the groove.

In embodiments where the at least one groove comprises a first groove and a second groove, the first groove may be adjacent to the second groove and the non-insulating layer may form the first face of the first groove and second face of the second groove. Thus, the non-insulating layer may electrically connect adjacent grooves.

Optionally, adjacent grooves may extend in parallel to each other across the surface of the substrate. Further optionally, adjacent grooves may extend linearly in parallel to each other.

As used herein, a non-insulating material may include a conductor material, or a non-insulating material may include a semiconductor material. Stated differently, a non-insulating material referred to herein may include at least one conductor material, or may include at least one semiconductor material, or may include at least one conductor material and at least one semiconductor material.

In certain embodiments, the electronic device may be an energy storage device. In such embodiments, the non-insulating material may comprise a conductor material. The cavity of the at least one groove may be at least partially filled with a capacitor material. Thus, the capacitor material may store electrical energy or charge.

In certain embodiments, the electronic device may be an electronic sensor device. The electronic sensor device comprising:
  a detection medium provided within the at least one groove, arranged to contactingly engage the non-insulating material of the first and second faces, and adapted to be contactingly engaged by an analyte;

wherein the at least one groove has a cross-sectional profile including at least a groove depth within the substrate and a groove width at a surface of the substrate; and wherein the cross-sectional profile or the detection medium is adapted such that, in use, a signal response is provided comprising a first response phase and a subsequent second response phase in response to an engagement of the analyte with the detection medium.

The detection medium may comprise a medium surface and a medium body. The first response phase may be provided in response to an engagement of the analyte with the medium surface. The second response phase may be provided in response to an engagement of the analyte within the medium body.

The signal response may comprise a change in at least one predetermined electrical characteristic of the at least one groove. The predetermined electrical characteristic may be an impedance or a capacitance or a resistance of the at least one groove.

In certain embodiments, the non-insulating material of the electronic sensor device may comprise a conductor material. In certain embodiments, the non-insulating material of the electronic sensor device may comprise a semiconductor material. Stated differently, a non-insulating material of the electronic device may include at least one conductor material, or may include at least one semiconductor material, or may include at least one conductor material and at least one semiconductor material.

In certain embodiments of the electronic device, the at least one groove of the electronic device may be from 5 mm to 1000 mm long, 5 to 200 mm long or preferably 330 mm long. The first and second faces of the at least one groove may each have a depth of from 100 nm to 10 μm.

The width of the at least one groove may be less than or equal to 100 μm, may be preferably less than or equal to 40 μm, and yet more preferably may be within the range 0.5 μm to 10 μm. The groove width is determined by the distance between the first and second faces of the at least one groove at a surface of the substrate.

A groove aspect ratio of the at least one groove may be defined as the ratio of the groove depth to the groove width. The groove depth is determined by the distance between the base of the at least one groove at the surface of the substrate. That is, the groove depth is determined by the vertical distance that the groove extends within the substrate. The groove aspect ratio may be within the range 0.1:1 to 50:1 or preferably the groove aspect ratio may be within the range 1:1 to 6:1.

When the electronic device comprises an electronic sensor device, increased reliability and efficiency of the electronic sensor device may be achieved by providing grooves with a width of up to 10 μm. Additionally or alternatively, the efficiency of the electronic sensor device may be improved by having a groove aspect ratio within the range 0.1:1 to 50:1 or preferably within the range 1:1 to 6:1.

The substrate of the electronic device may comprise one or more layers of insulating material. The substrate may comprise a curable resin and in particular a UV curable resin. The substrate may be flexible. The substrate may comprise a curable resin layer and a flexible base layer. The base layer may comprise the insulating material. The substrate may comprise: one or more of an acrylic resin coated onto polyvinyl chloride (PVC), acrylic resin coated onto polyethylene terephthalate (PET), acrylic resin coated onto polyethylene naphthalate (PEN), a biopolymer coated onto polyvinyl chloride (PVC), a biopolymer coated onto polyethylene terephthalate (PET), a biopolymer coated onto polyethylene naphthalate (PEN) and a cyclic olefin polymers (COP).

The non-insulating material may comprise a binding material matrix and a non-insulating filler material. The non-insulating filler material may comprise a metal. The non-insulating filler material may comprise a semiconductor. The non-insulating filler material may comprise a n-type or a p-type semiconductor. The binding material may be any suitable binding material provided the resulting combination of the binding material matrix and non-insulating filler material is non-insulating. Non-limiting examples of the binding material include a glue or a curable polymer. In certain embodiments, volume fraction of the filler material in the non-insulating material is greater than 37%.

The non-insulating material may comprise a metal. The non-insulating material may comprise one or more of aluminium, bismuth, cadmium, chromium, copper, gallium, gold, indium, lead, magnesium, manganese, samarium, scandium, silver, tin, zinc, terbium, selenium, molybdenum, yttrium, holmium, calcium, nickel, tungsten, platinum, palladium, vanadium, carbon and stainless steel.

The non-insulating material may comprise a n-type or a p-type semiconductor. The n-type or a p-type semiconductors may comprise one or more of silicon, amorphous silicon, hydrogenated amorphous silicon, aluminium, germanium, gallium nitride, gallium arsenide, aluminium phosphide, aluminium arsenide, copper iodide, zinc oxide, lead sulphide, selenium, boron phosphide, boron arsenide, gallium, indium nitride, indium phosphide, cadmium selenide, cadmium sulphide, cadmium telluride, zinc sulphide, zinc selenide, zinc telluride, copper chloride, copper sulphide, copper oxide, tin sulphide, tin telluride, zinc phosphide, titanium oxide, tin oxide, lithium niobate, lead iodide, gallium selenide, tin sulphide, iron oxide, nickel oxide, copper indium selenide, copper zinc tin sulphide, iron disulphide, copper zinc antimony sulphide, tungsten oxide, niobium pentoxide and lead oxide.

The non-insulating material may be a n-type semiconductor which may comprise one or more of silicon, germanium, phosphorus, selenium, tellurium, cadmium sulphide, zinc, indium, titanium, niobium, nickel, tin, oxides of the above and doped semiconducting oxides.

The non-insulating material may be a p-type semiconductor which may comprise one or more of silicon, germanium, cadmium telluride, copper indium gallium selenide ('CIGS'), copper indium gallium diselenide, copper indium selenide (CIS), copper gallium selenide, copper oxide, nickel oxide, tungsten oxide, boron, beryllium, zinc, cadmium, copper zinc tin sulphide (CZTS), perovskite, calcium titanium oxide, calcium titanate and lead sulphide.

The non-insulating material may be an electron blocking material such as molybdenum trioxide. The electron blocking material may be a hole transporting, electron blocking material, such as vanadium pentoxide, tungsten oxide, tantalum pentoxide, spiro-polymers, and p-dot polymers. The non-insulating material may be a heterojunction, that is a mixture of one or more of a p-type semiconductor, n-type semiconductor and donor acceptor material.

The non-insulating material may include any suitable material for which the resultant conduction of the non-insulating layer and its geometry is such that when the non-insulating material is combined with a dielectric material filling the cavity of the groove the overall time constant of the arrangement results in no significant attenuation of frequencies under 100 Hz. This enables suitable signals to be recovered from the resulting electronic device during use.

The capacitor material may be a high dielectric material. The capacitor material may store electrical energy using static double-layer capacitance and/or electrochemical pseudocapacitance or any separation of charge mechanism.

In accordance a second aspect of the present invention, there is provided a method of producing an electronic device. The method including the steps of:

providing a substrate comprising a non-insulating material;

forming at least one groove into the substrate, the at least one groove having a first and a second face partially formed from the non-insulating material and a cavity between the first and second faces;

wherein the non-insulating material of the first and second faces are electrically separated from one another.

The substrate may comprise a non-insulating layer and an insulating layer. In such embodiments, the step of forming the at least one groove into the substrate may comprise forming the groove so that it extends through the non-insulating layer into the insulating layer.

The method may comprise at least partially filling the cavity with a capacitor material.

BRIEF DESCRIPTION OF THE DRAWINGS

Embodiments of the invention are further described hereinafter with reference to the accompanying drawings, in which:

FIG. 5 shows (a) a model signal response under test conditions and (b) the metric definitions of the model signal response, of an example electronic sensing device according to an embodiment of the invention;

FIG. 6 shows empirical data of a capacitance signal response in response to liquid water measured by an electronic sensor device according to an embodiment of the invention incorporating (a) both a first detection medium, (b) a first detection medium alone and (c) a second detection medium alone;

FIG. 7 shows empirical data of a capacitance signal response of a further example embodiment electronic sensor device under test conditions in response to an atmosphere including (a) 5% carbon dioxide gas and (b) initially 2% and subsequently 5% carbon dioxide gas;

DETAILED DESCRIPTION

Figure 1:
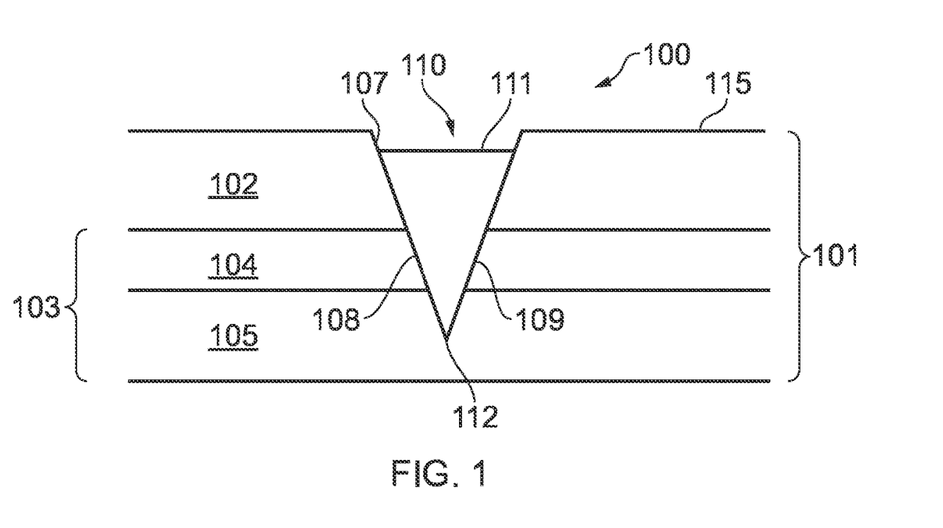
FIG. 1 schematically shows a cross-section of an electronic storage device according to an embodiment of the present invention.

FIG. 1 shows an example of an electronic device 100 according to an embodiment of the invention. The electronic device 100 is an energy storage device. The energy storage device 100 comprises a substrate 101. The substrate 101 having a layer of non-insulating material 102 and a layer of insulating material 103. The layer of insulating material 103 comprises a first layer 104 and a second layer 105 of different insulating materials. For example, the first layer of insulating material 104 may comprise acrylic and the second layer of insulating material 105 may comprise onto polyethylene terephthalate (PET). The non-insulating material 102 comprises a conductor material and covers the layer of insulating material 103.

The energy storage device 100 comprises a groove 107 formed in the substrate 101. The groove 107 is typically an elongate groove 107. The groove 107 has a first face 108 and a second face 109 and a cavity 110 therebetween. The groove 107 extends through the layer of non-insulating material 102 into the layer of insulating material 103. Thus, a portion of the first and second faces 108, 109 are formed from the non-insulating material 102 and the non-insulating material 102 of the first and second faces 108, 109 of the groove 107 are electrically separated from one another. Consequently, when the energy storage device 100 is in an unfilled state, i.e. when there is no material filling or partially filling the cavity 110 of the groove 107, the first face 108 and the second face 109 of the groove 107 are electrically separated from one another. In the embodiment of FIG. 1, the non-insulating material 102 of the first and second faces 108, 109 of the groove 107 are electrically separated from one another at the base 112 of the groove 107.

The cavity 110 of the groove 107 is partially filled with a capacitor material 111. The non-insulating material 102 of the first face 108 and second face 109 is in contact with capacitor material 111 in the cavity 110.

Figure 2:
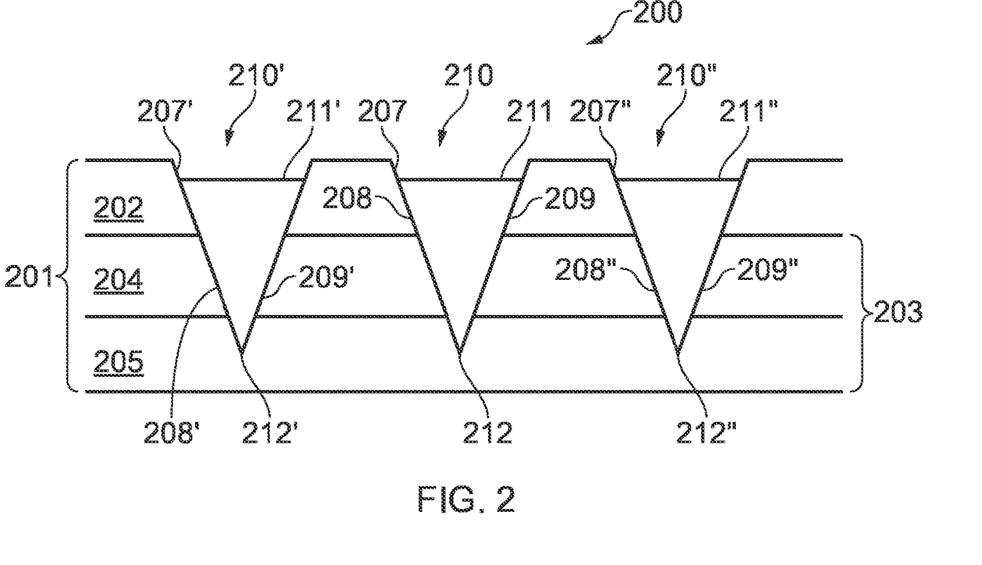
FIG. 2 schematically shows a cross-section of an electronic storage device according to another embodiment of the present invention.

FIG. 2 shows an example of an electronic device 200 according to an embodiment of the invention. The electronic device 200 is also an energy storage device. The energy storage device 200 of FIG. 2 comprises a substrate 201 having a plurality of grooves 207, 207', 207". Each groove 207, 207', 207" in the substrate 201 has the same features as the groove 107 described for the embodiment shown in FIG. 1. Reference numerals in FIG. 2 correspond to those used in FIG. 1 with respect to alike component and features, but are transposed by 100.

As shown in the embodiment of FIG. 2, each groove 207, 207', 207" extends through the layer of non-insulating material 202 into the layer of insulating material 203. The non-insulating material 202 comprises a conductor material and covers the layer of insulating material 203. The non-insulating layer 202 forms the first face of a first groove and the second face of an adjacent groove. Thus, the first face 208 of the one groove 207 is in electrical communication with the second face 209' of the adjacent groove 207'. As such, voltage of the energy storage device 200 is shared across multiple grooves 207, 207', 207" of the device 200.

During use, a voltage may be applied across the groove 107 or grooves 207, 207', 207" in the substrates 101, 201 of FIGS. 1 and 2. The capacitor material 111, 211, 211', 211" in each groove 107, 207, 207', 207" then stores electrical energy. By having the first and second faces of an energy storage device formed from a non-insulating material means that no additional process is required to provide the conductive material on the first and second faces. Thus, improving the production speed of such devices. Additionally, narrower grooves can be formed because the grooves do not need to be sufficiently wide to enable conductive material to be applied to the faces of the groove after the grooves have been formed. Narrow grooves of less than 10 µm in width may be formed (the groove width is determined by the distance between the first and second faces 108, 109 of the groove 107 at a surface 115 of the substrate 101). Thus, an energy storage device with greater sensitivity can be produced. Furthermore, since no additional step is required to provide the non-insulating material on the grooves, the accuracy of placement and formation of the grooves is also improved. The grooves can be formed with less than 1 µm location accuracy.

The energy storage devices 100, 200 of the embodiments shown in FIGS. 1 and 2 may be produced by providing the substrate 101, 201 comprising the non-insulating layer 104, 204 of conductive material and the insulating layer 103, 203. The groove 107 or grooves 207, 207', 207" are formed in the substrate 101 by any suitable means. In a non-limiting example, each groove 107, 207, 207', 207" may be formed by etching or embossing, or each groove 107, 207, 207', 207" may be laser formed. The groove 107 is formed so that the first face 108 and the second face 109 are partially formed from the non-insulating layer 104 and the non-insulating layer 104 of the first and second faces 108, 109 are electrically separated from one another. The cavity 110 of the groove 107 is then partially filled with the capacitor material 111.

Figure 3:
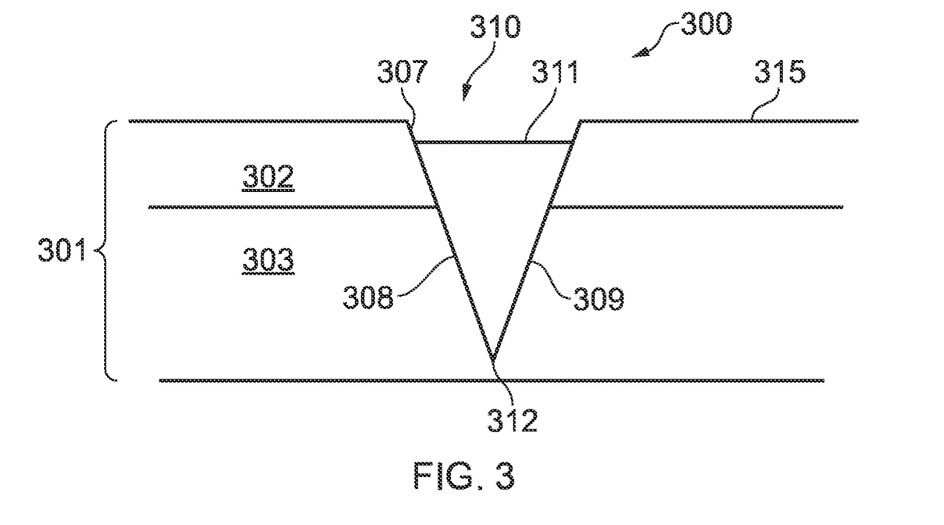
FIG. 3 schematically shows a cross-section of an electronic storage device according to another embodiment of the present invention.

FIG. 3 shows another example of an electronic device 300 according to an embodiment of the invention. The electronic device 300 shown in FIG. 3 is an energy storage device. Reference numerals in FIG. 3 correspond to those used in FIG. 1 with respect to alike component and features, but are transposed by 200. The energy storage device 300 comprises a substrate 301. The substrate 301 having a layer of non-insulating material 302 and a layer of insulating material 303. The non-insulating material 302 comprises a conductor material and covers the layer of insulating material 303. The energy storage device is the same as that described above for FIG. 1 except that the layer of insulating material 303 is formed from a single layer insulating material.

Figure 4:
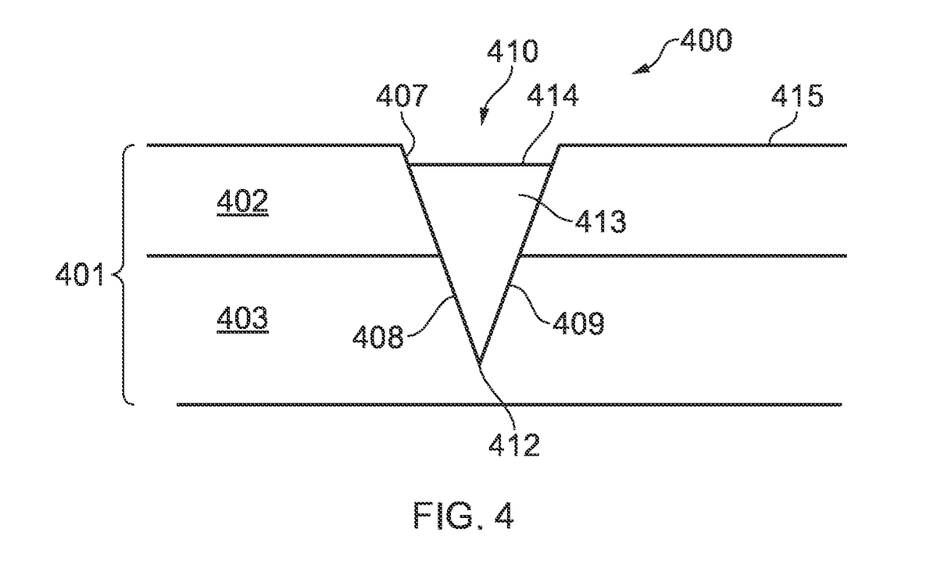
FIG. 4 schematically shows a cross-section of an electronic sensing device according to another embodiment of the present invention.

In an alternative embodiment, the electronic device may be an electronic sensor device 400 as shown in FIG. 4. Reference numerals in FIG. 4 correspond to those used in FIG. 1 with respect to alike component and features, but are transposed by 300. The electronic sensor device 400 may be adapted such that a signal response is provided in response to engagement with an analyte.

In a similar manner as described above, the electronic sensor device 400 comprises a substrate 401 having a layer of non-insulating material 402 and a layer of insulating material 403. The electronic sensor device 400 comprises at least one groove 407 formed in the substrate 403, the groove 407 having a first face 408 and a second face 409 and a cavity 410 therebetween. The groove 407 has a cross-sectional profile including at least a groove depth within the substrate and a groove width at a surface 415 of the substrate 401. As described above, the groove 407 extends through the layer of non-insulating material 402 into the layer of insulating material 403. As such, a portion of the first and second faces 408, 409 are formed from the non-insulating material 402 and the non-insulating material 403 of the first and second faces 408, 409 of the groove 407 are electrically separated from one another. The cavity 410 of the groove 407 is partially filled with a detection medium 413. The non-insulating material 402 of the first face and second face 408, 409 is in contact with detection medium 413 in the cavity 410. The detection medium 413 is provided with a surface 414 which is exposed within the groove 407, such that an analyte entering the groove 407 engages with the detection medium 413. When the energy storage device 400 is in an unfilled state, i.e. when the detection medium 413 does not fill cavity 410 of the groove 407, the first face 408 and the second face 409 electrically separated from one another.

The groove 407 may be formed such that it extends across the surface 415 of the substrate 401 from a proximal end to distal end. The groove 407 may extends linearly across the substrate 401. In certain other examples, the groove may extend across the substrate in any suitable orientation or configuration. In certain embodiments, the electronic sensor device 400 may comprise a series of grooves 407.

In use, the electronic sensor device 400 is connected within an electrical circuit, such as a two terminal device including a detector. By applying an electrical potential difference across the electronic sensor device 400, an electrical characteristic of the electronic sensor device 400 can be detected and measured using a suitable detector. In certain examples, the electrical characteristic is the capacitance measured across the groove 407. Optionally, the electrical characteristic is the impedance measured across the groove 407. Further optionally, the electrical characteristic is the resistance measured across the groove 407.

During use, an analyte engages the detection medium 413 of the electronic sensor device 400. Engagement of the analyte with the detection medium 413 changes the electrical characteristic of the electronic sensor device 400. Thus, engagement of the analyte provides a signal response in the electronic sensor device 400 that indicates presence of the analyte. Either the cross-sectional profile of the groove 407 or the detection medium 413 is adapted such that the signal response provided includes a first response phase and a subsequent second response phase.

In the first response phase, the signal response may be provided by a surface effect of the analyte upon the detection medium 413. That is, in the first response phase, the signal response may be provided by engagement with the analyte upon the surface 414 of the detection medium 413. The first response phase thus provides a first change to the dielectric characteristics of the electronic sensor device 400 formed within the groove 407. In the second response phase, the signal response may be provided by a bulk effect of the analyte upon the detection medium 413. That is, in the second response phase, the signal response may be provided by engagement with the analyte upon a certain body, or volume of the detection medium 413 beyond its surface 414. In this way, the body or volume of the detection medium 413 may dissolve, intercalate or otherwise take up an analyte within its body. The second response phase thus may provide a second change to the dielectric characteristics of the electronic sensor device 400 formed within the groove 407. The first and second changes of the dielectric characteristics may be detected by measuring, for example, the capacitance or impedance across the device 400. Thus, the detection medium 413 is arranged to provide both a surface engagement and a bulk engagement with the analyte so that the electronic sensor device 400 provides a signal response including first and second response phases.

The arrangement of the detection medium 413 may be tuned to provide characteristically distinguishable first and second phase responses. The electronic sensor device 400 may be adapted by selecting an appropriate groove aspect ratio or width, in order to provide a first phase response which is clearly and distinctively differentiated from the second phase response. For example, the groove aspect ratio may be within the range 0.1:1 to 50:1 or more preferably the groove aspect ratio may be within the range 1:1 to 6:1. For example, the groove width may be less than or equal to 100 µm, more aptly, is less than or equal to 40 µm, and yet more aptly is within the range 0.5 µm to 10 µm.

The detection medium 413 may be a suitable material able to provide a measurable electrical characteristic which provides suitable first and second phase responses to the electronic sensor device 400. The choice of detection medium 413 may depend on the analyte that is being detected. In certain embodiments, the detection medium 413 may be capacitor material in which case the capacitance of the device 400 may change once the analyte is placed on the device 400. In certain embodiments, the analyte may be a liquid, such as water or an aqueous solution, or the analyte may be a gas. Where the analyte is a liquid, the detection medium 413 may be a gas, e.g. air. The electronic sensor device 400 may be a diode type sensor or ion selective type sensor. Thus, the non-insulating material 402 of the electronic sensor device 400 may comprise a conductor material or the non-insulating material 402 may comprise a semiconductor material.

As described above for the embodiments of FIGS. 1 and 2, the groove 407 may be formed in the substrate 401 by any suitable means. In a non-limiting example, the groove 407 may be formed by etching or embossing, or the groove 407 may be laser formed. By forming the electronic sensing device 400 with a portion of the first and second faces 408, 409 formed from a non-insulating material enables the grooves 407, and consequently the sensor, to be made in any shape. Thus, the electronic sensor device 400 is not limited to providing an area of detection but the sensor 400 can be formed to provide a desired geometry of detection.

Figure 5A:
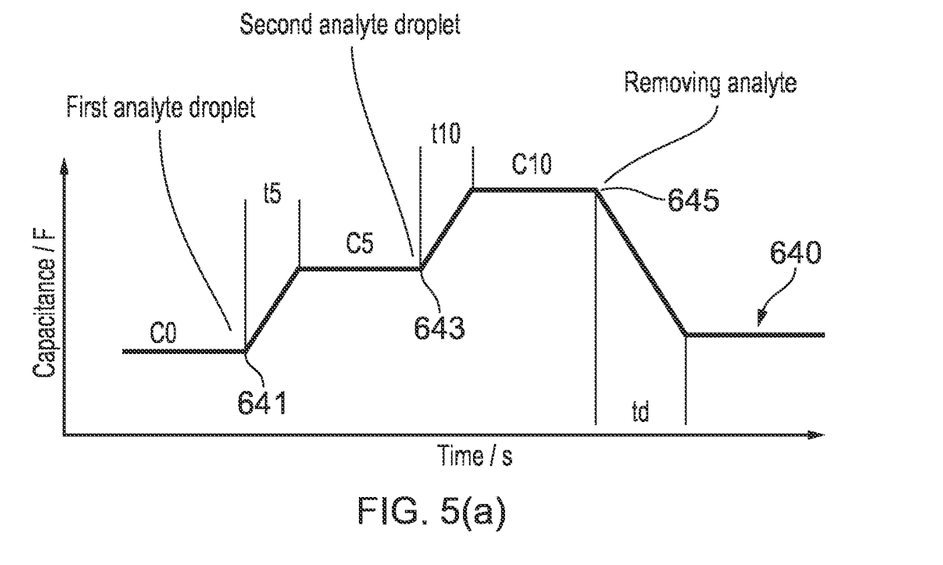

Referring now to FIG. 5, there is shown a model signal response using, for example, the electronic sensor device 400 when connected to an electrical detector. Particularly, there is shown in FIG. 5(*a*) a model capacitance signal response 640 measured over time as a first analyte portion and then a second analyte portion contactingly engage with the electronic sensor device 400. In the model signal response, the analyte portions are droplets of liquid water, although the signal response may be indicative of a range of analytes in fluid form.

Figure 5B:
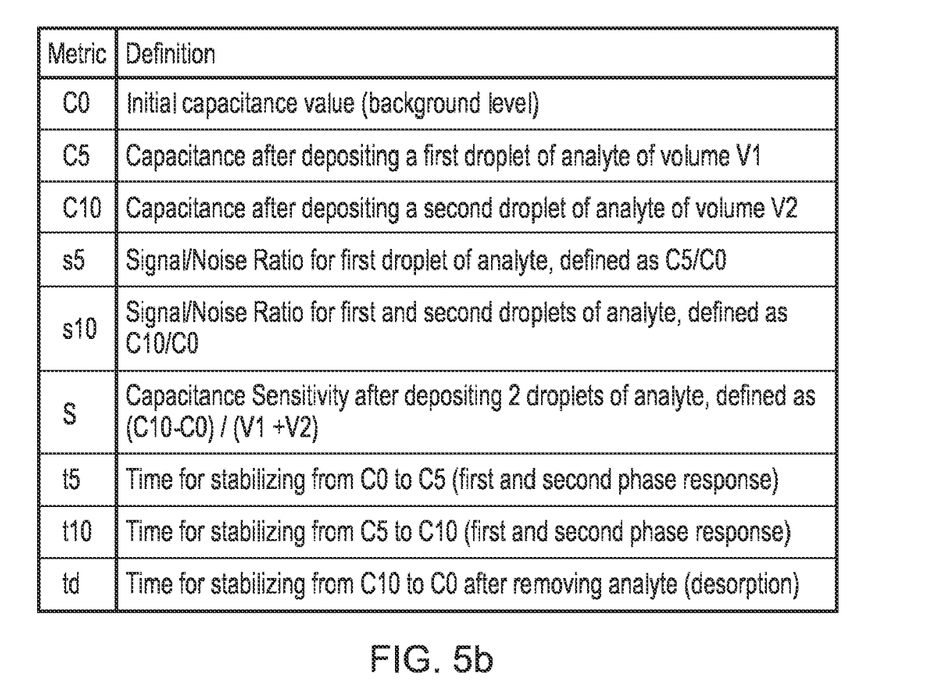

The metric definitions taken from the model signal response 640 are shown in FIG. 5(*b*). An initial capacitance value (C0) corresponds to a background signal response. That is, C0 corresponds to a capacitance value measured prior to engagement of an analyte with the electronic sensor device 400. In this way, C0 represents a constant capacitance signal response of the sensor before an analyte is present.

A first analyte droplet engages 641 the sensor. Engagement of the first analyte droplet provides a first signal response in the electronic sensor device 400. The first analyte has a volume V1. After the first signal response the first droplet remains engaged with the electronic sensor device 400. The first signal response includes first and second phase responses corresponding to a surface effect of the first analyte droplet on the electronic sensor device 400, and a bulk effect of the first analyte droplet as described herein.

The first phase response of the first signal response has a duration of time interval t5, after which the detector measures a first characteristic capacitance C5. C5 is a different capacitance to the baseline capacitance C0. C5 represents a second phase response of the first signal response. That is C5 represents a static capacitance signal response following engagement of the first analyte droplet with the electronic sensor device 400.

A second analyte droplet engages 643 the electronic sensor device 400. Engagement of the second analyte droplet provides a second signal response in the electronic sensor device 400. The second analyte has a volume V2. After the second signal response the second droplet remains engaged with the electronic sensor device 400. The second signal response includes first and second phase responses corresponding to a surface effect of the second analyte droplet on the sensor, and a bulk effect of the second analyte droplet as described herein.

The first phase response of the second signal response has a duration of time interval t10, after which the detector measures a second characteristic capacitance C10. C10 is a different capacitance to both the baseline capacitance C0 and the first characteristic capacitance C5. C10 represents a second phase response of the second response signal. That is, C10 represents a static capacitance signal response following engagement of the second analyte droplet engages the electronic sensor device 400.

Additionally, or alternatively, the second phase response of either the first or second signal responses may include a change in the measured electrical characteristic. That is, a second phase response is not limited to only a static electrical characteristic, such as capacitance. In certain examples, a second phase response may include a change of electrical characteristic over time caused by the bulk effect of an analyte upon the electronic sensor device 400. In this way, within the second phase response, the rate of change may decrease to zero over a predetermined time. In other words, within a second phase response the electrical characteristic may tend towards a static measurement as the analyte approaches an equilibrium with the bulk volume of the detection medium.

The model response 640 also includes removal 645 of the first and second analyte droplets from the electronic sensor device 400. Removal of the analyte droplets provides a recovery signal response in the electronic sensor device 400. The recovery signal response includes first and second phase responses corresponding to a discontinuation of the surface effect by the analyte on the electronic sensor device 400, followed by a discontinuation of the bulk effect of the analyte on the electronic sensor device 400.

The recovery signal response has a duration of time interval td, after which the detector measures the baseline capacitance C0.

A signal to noise ratio, s5, for a signal response provided by a first analyte droplet is defined herein as C5/C0. A signal to noise ratio, s10, for a signal response provided by a first and second analyte droplets is defined herein as C10/C0. A capacitance sensitivity S to first and second analyte droplets is thus defined herein as:

$$S = \frac{(C10 - C0)}{(V1 + V2)}$$

The first signal response of model response shown in FIG. 5, including the respective first and second phase responses may provide be sufficient to indicate that the electronic sensor device 400 has detected an analyte. That is, the first signal response on its own may provide a reliable, measurable change in electrical characteristic, in this case capacitance, to indicate an analyte has been detected. The second signal response may not be required in order to indicate that the sensor has detected an analyte. Thus, the second signal response shown in FIG. 5 is provided to illustrate that an electronic sensor device as described herein may provide multiple signal responses due to engagement with increasing volumes of analyte.

Figure 6A:
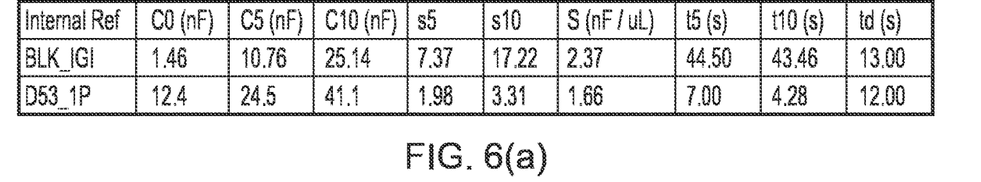

Referring now to FIG. 6, there is shown empirical data of a capacitance signal response measured when two different electronic sensor devices according to an aspect of the invention are incorporated into a two terminal device that includes a detector.

The two sensors are identified as BLK_IGI and D53_1P. The sensors are each formed from a reference substrate including a series of grooves having a groove width of 5.3 µm and a groove depth of 10 µm. The reference substrate has a groove density of 66%. The non-insulating material of the first and second faces of the grooves is a metal. That is, the non-insulating material is aluminium.

Figure 6B:
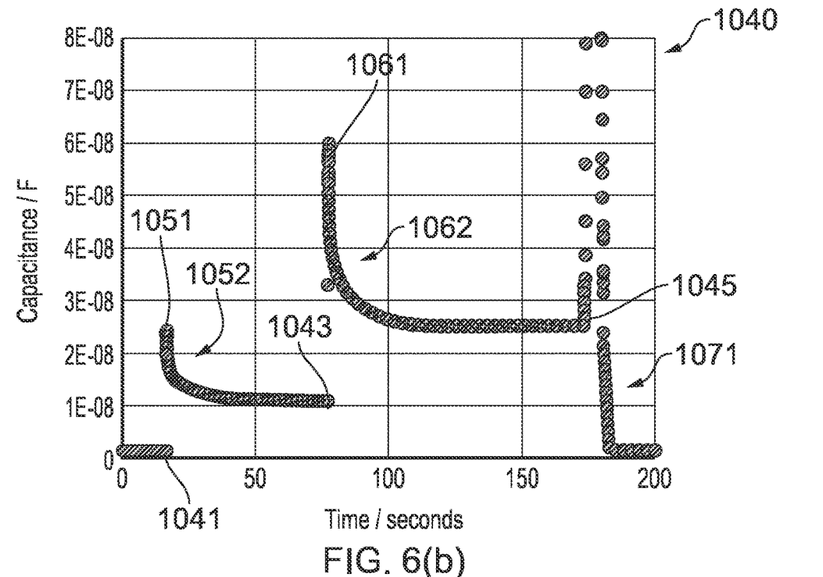

The sensor BLK_IGI includes air as a detection medium. FIG. 6(b) shows the signal response 1040 of sensor BLK_IGI in response to a first and second droplet of analyte, in this case liquid water. The metrics of signal response are provided in the table shown in FIG. 6(a), corresponding the metrics of the model response explained with reference to FIG. 5.

A first droplet engages 1041 with the sensor providing a first signal response. The first signal response includes a first phase response 1051 in which the capacitance increases almost instantaneously from a baseline of around 0 F to around $2.5 \times 10^{-8}$ F, a change of around $2.5 \times 10^{-8}$ F or 25 nF. The signal to noise ratio of the first phase response, s5, was measured as 7.37. The first phase response corresponds to a surface effect of the first droplet on the sensor.

A second phase response 1052 is provided in which the capacitance decreases to a first characteristic capacitance C5. The second phase response corresponds to a bulk effect of the first droplet on the sensor. The time for the first signal response, t5, is 44.5 seconds.

A second droplet engages 1043 with the sensor providing a second signal response. The second signal response includes a first phase response 1061 in which the capacitance increases almost instantaneously from around $1.0 \times 10^{-8}$ F to around $6.0 \times 10^{-8}$ F, a change of around $5.0 \times 10^{-8}$ F or 50 nF. The signal to noise ratio of the first phase response, s10, was measured as 17.22. The first phase response corresponds to a surface effect of the second droplet on the sensor.

A second phase response 1062 is provided in which the capacitance decreases to a second characteristic capacitance C10. The second signal response corresponds to a bulk effect of the first droplet on the sensor. The time for the second signal response, t10, is 43.46 seconds.

The first and second droplets are removed 1045 from the sensor, providing a recovery signal response 1071.

Figure 6C:
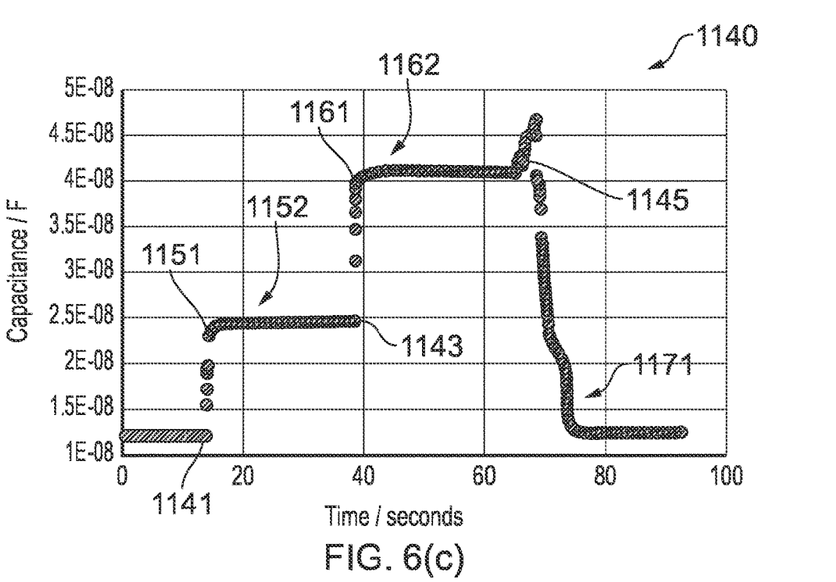

The sensor D53_1P includes a detection medium including Dupont Luxprint 8153 the further details of which are provided herein. The detection medium is provided as a single coat of the grooved area of the reference substrate.

FIG. 6(c) shows the signal response 1140 of sensor D53_1P measured in response to a first and second droplet of analyte, in this case liquid water. The metrics of signal response are provided in the table shown in FIG. 6(a), corresponding the metrics of the model response explained with reference to FIG. 5.

A first droplet engages 1141 with the sensor providing a first signal response. The first signal response includes a first phase response 1151 in which the capacitance increases almost instantaneously from around 0 F to around $2.5 \times 10^{-8}$ F. The signal to noise ratio of the first phase response, s5, was measured as 1.98. The first phase response corresponds to a surface effect of the first droplet on the sensor.

A second phase response 1152 is provided in which the capacitance decreases to a first characteristic capacitance C5. The second signal response corresponds to a bulk effect of the first droplet on the sensor. The time for the response, t5, is 7.00 seconds.

A second droplet engages 1143 with the sensor providing a second signal response. The second signal response includes a first phase response 1161 in which the capacitance increases almost instantaneously from around $2.5 \times 10^{-8}$ F to $4.0 \times 10^{-8}$ F. The signal to noise ratio of the first phase response, s10, was measured as 3.31. The first phase response corresponds to a surface effect of the second droplet on the sensor.

A second phase response 1162 is provided in which the capacitance decreases to a second characteristic capacitance C10. The second phase response corresponds to a bulk effect of the first droplet on the sensor. The time for the response, t10, is 4.28 seconds.

The first and second droplets are removed 1145 from the sensor, providing a recovery signal response 1171. The time for the recovery signal response, td, is 12.00 seconds.

Figure 9A:
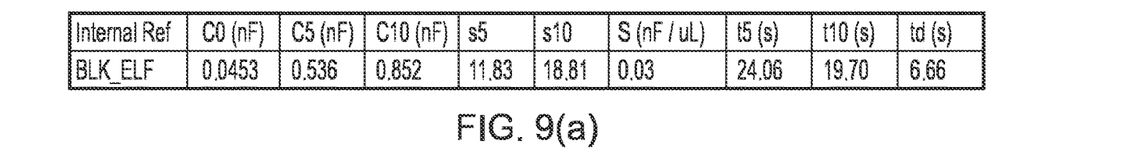
FIG. 9 shows empirical data of a capacitance signal response in response to liquid water measured by an electronic sensor device according to an embodiment of the invention incorporating a third detection medium.

Referring now to FIG. 9, there is shown empirical data of a capacitance signal response measured when incorporating an electronic sensor device with a substantially reduced groove aspect ratio into a two terminal device that includes a detector. The electronic sensor device, identified as BLK_ELF is formed from a reference substrate including a series of grooves having a groove width of around 80 µm and a groove depth of less than 1 µm, corresponding to a groove aspect ratio of 0.013.

Figure 9B:
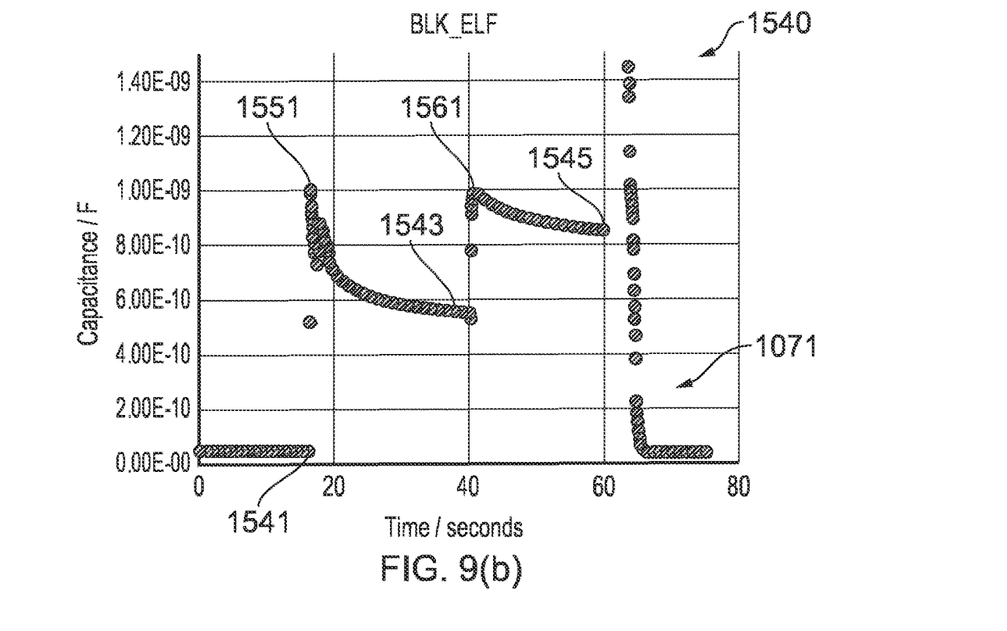

The sensor BLK_ELF includes air as a detection medium. FIG. 9(b) shows the signal response 1540 of sensor BLK_ELF in response to a first and second droplet of analyte, in this case liquid water. The metrics of signal response are provided in the table shown in FIG. 9(a), corresponding the metrics of the model response explained with reference to FIG. 5.

A first droplet engages 1541 with the electronic sensor device providing a first signal response. The first signal response includes a first phase response 1551 in which the capacitance increases almost instantaneously from a baseline of around 0 F to around $1.0 \times 10^{-9}$ F, a change of around $1.0 \times 10^{-9}$ F, or 1 nF.

A second droplet engages 1543 with the electronic sensor device providing a second signal response. The second signal response includes a first phase response 1561 in which the capacitance increases almost instantaneously from around $6.0 \times 10^{-10}$ F. to around $1.0 \times 10^{-9}$ F, a change of around $4.0 \times 10^{-10}$ F., or 0.4 nF.

Thus, in comparison with the first phase responses 1051, 1061 of the BLK-IGI example shown in FIG. 6, the respective first phase responses 1551 and 1561 of BLK-ELF are substantially weaker. That is the change in capacitance of the BLK-IGI sample is of a magnitude, in the first signal response of over 25 times greater, and in the second signal response of around 200 time greater, than that of BLK-ELF.

The inventors thereby conclude that due to its groove width and aspect ratio, the BLK-ELF sensor device would be inadequate to provide a reliable signal response.

Referring now to FIG. 7 there is shown empirical data of a capacitance signal response of a further example embodiment electronic sensor device under test conditions in response to an atmosphere including elevated concentrations of carbon dioxide gas.

The sensor comprises the substantially the same groove configuration as the sensors of samples BLK_IGI and D53_P described in reference to FIG. 6. The detection medium includes Dupont Luxprint 8155 mixed with an imidazolium ionic liquid, the details of which are provided herein. Within the detection medium, the Dupont Luxprint 8155 provides a binder. The imidazolium ionic liquid provides an active component.

Figure 7A:
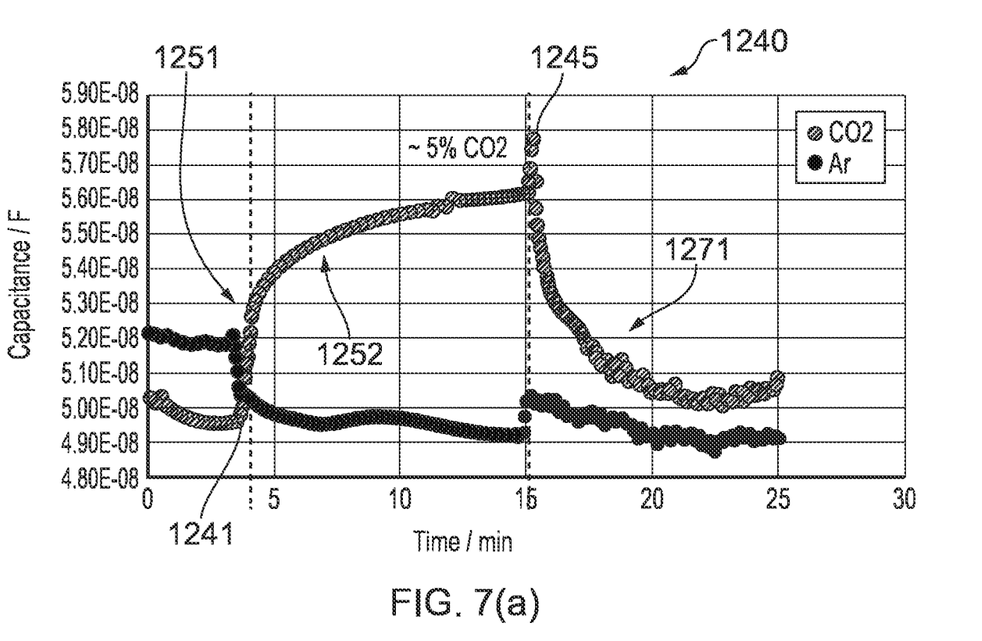

FIG. 7($a$) shows the signal response 1240 of electronic sensor device in response to the introduction an analyte, in this case an atmosphere of 5% carbon dioxide, as explained with reference to FIG. 6. A control signal response including an electronic sensor device to which an argon atmosphere is provided is also shown.

Carbon dioxide engages 1241 with the electronic sensor device providing a signal response. The signal response includes a first phase response 1251 in which the capacitance increases from a baseline of around $5.0 \times 10^{-8}$ F to at least $5.4 \times 10^{-8}$ F. The first phase response corresponds to a surface effect of the carbon dioxide on the sensor. The time for the first phase response to occur is around 1 minute.

A second phase response 1252 is provided in which the capacitance increases at a second, in this case slower, rate to a first characteristic capacitance of around $5.6 \times 10^{-8}$ F. The phase signal response corresponds to a bulk effect of the carbon dioxide on the sensor. The time for the response is around 6 minutes.

The 5% carbon dioxide atmosphere is discontinued by removing 1245 the lid of a test chamber holding the electronic sensor device during testing. Discontinuation of the 5% carbon dioxide from the sensor provides a recovery signal response 1271.

Figure 7B:
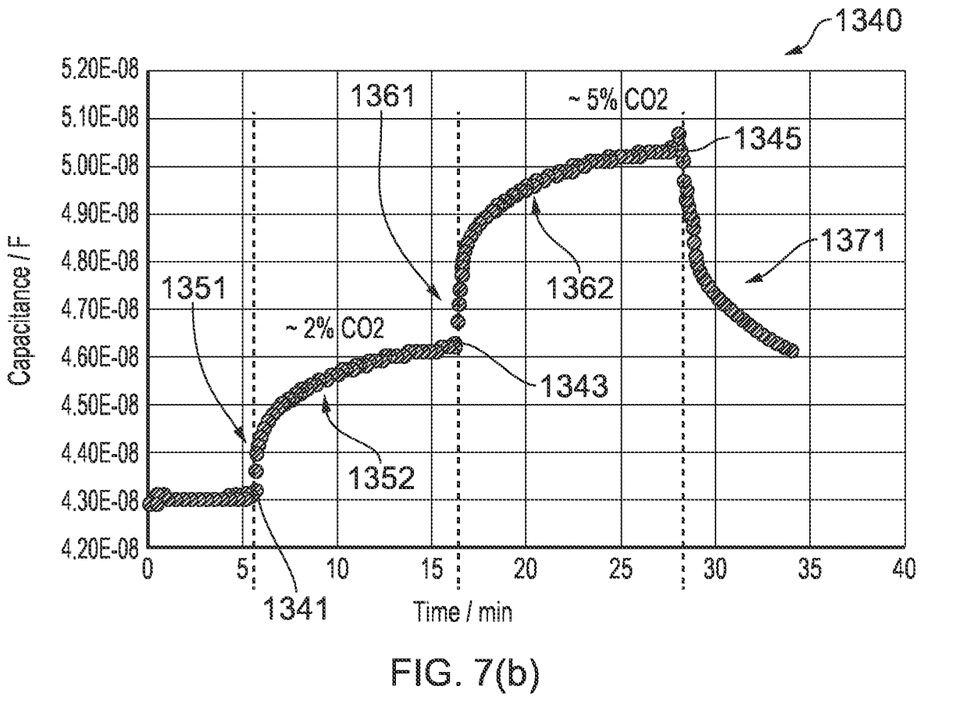

FIG. 7($b$) shows the signal response 1340 of sensor in response to the introduction an analyte. Specifically, in the example used to obtain the data of FIG. 7($b$) the analyte is provide by an initial atmosphere of 2% carbon dioxide, followed by a subsequent atmosphere of 5% carbon dioxide.

With the initial carbon dioxide atmosphere, carbon dioxide engages 1341 with the sensor providing a first signal response. The first signal response includes a first phase response 1351 in which the capacitance increases from a baseline of around $4.3 \times 10^{-8}$ F to at least $4.4 \times 10^{-8}$ F. The first phase response corresponds to a surface effect of the carbon dioxide on the electronic sensor device. The time for the first phase response to occur is less than 1 minute.

A second phase response 1352 is provided in which the capacitance increases at a further, in this case slower, rate towards a first characteristic capacitance of around $4.6 \times 10^{-8}$ F. The second phase response corresponds to a bulk effect of the carbon dioxide on the electronic sensor device. The time for the response is around 10 minutes.

With the introduction of the subsequent carbon dioxide atmosphere, carbon dioxide engages 1343 with the electronic sensor device providing a second signal response. The second signal response includes a first phase response 1361 in which the capacitance increases from around $4.6 \times 10^{-8}$ F to at least $4.8 \times 10^{-8}$ F. The first phase response corresponds to a surface effect of the increased concentration of carbon dioxide on the electronic sensor device. The time for the first phase response to occur is less than 1 minute.

A second phase response 1362 is provided in which the capacitance increases at a further, in this case slower, rate towards a second characteristic capacitance of around $5.0 \times 10^{-8}$ F. The second phase response corresponds to a bulk effect of the increased concentration of carbon dioxide on the electronic sensor device. The time for the response is around 10 minutes.

The 5% carbon dioxide atmosphere is discontinued by removing 1345 the lid of a test chamber holding the sensor during testing. Discontinuation of the 5% carbon dioxide from the electronic sensor device provides a recovery signal response 1371.

Figure 8:
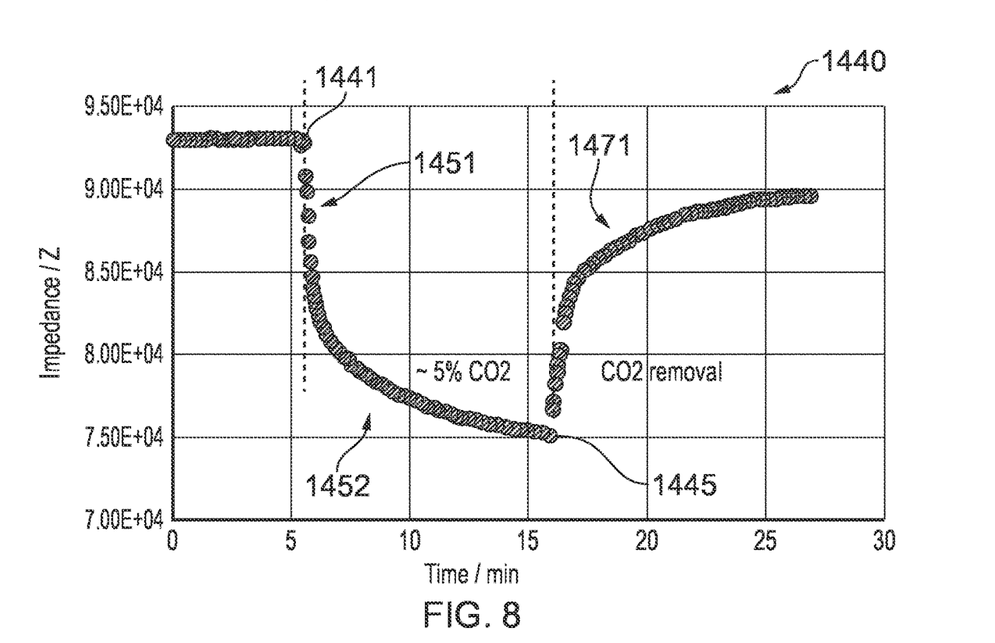
FIG. 8 shows empirical data of an impedance signal response of an electronic sensor device according to an embodiment of the invention in response to an atmosphere of 5% carbon dioxide gas.

Referring now to FIG. 8, there is shown empirical data of corresponding to measuring an impedance signal response during the introduction of an atmosphere including 5% carbon dioxide gas as described above in reference to FIG. 7($a$). In this way, the corresponding impedance signal response is shown including substantially the same features as the capacitance signal response.

Carbon dioxide engages 1441 with the sensor providing a signal response. The signal response includes a first phase response 1451 in which the impedance decreases from a baseline of around $9.3 \times 10^4$ Z to at below $8.5 \times 10^4$ Z. The first phase response corresponds to a surface effect of the carbon dioxide on the sensor. The time for the first phase response to occur is less than 1 minute.

A second phase response 1452 is provided in which the impedance decreases at a second, in this case slower, rate to a first characteristic impedance of around $7.5 \times 10^4$ Z. The phase signal response corresponds to a bulk effect of the carbon dioxide on the electronic sensor device. The time for the response is around 9 minutes.

The 5% carbon dioxide atmosphere is discontinued by removing 1445 the lid of a test chamber holding the electronic sensor device during testing. Discontinuation of the 5% carbon dioxide from the electronic sensor device provides a recovery signal response 1471.

Figure 10:
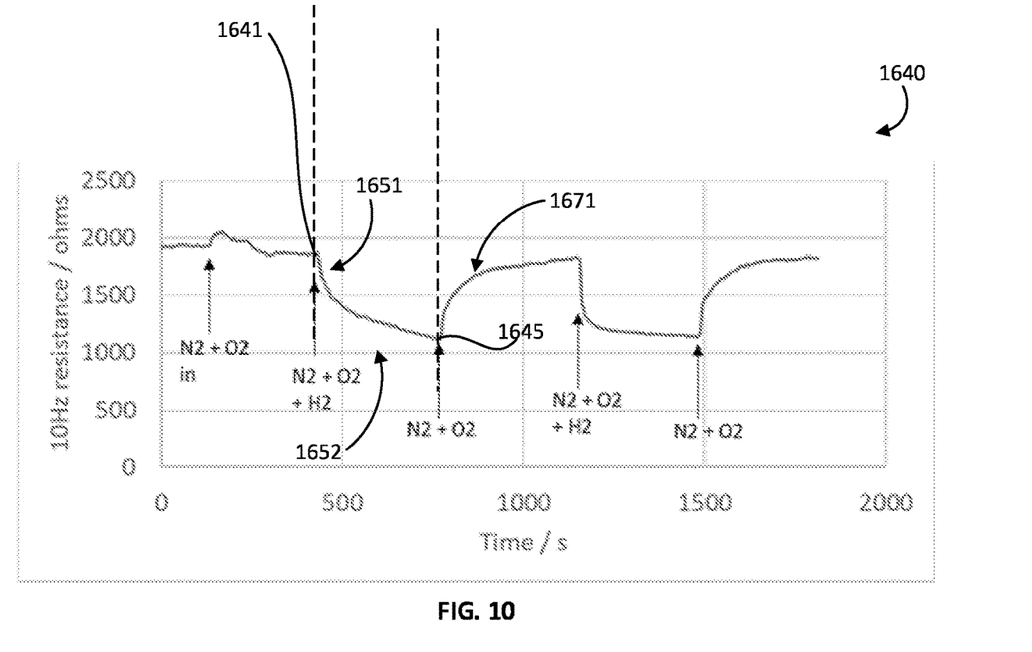
FIG. 10 shows empirical data of a resistance signal response of an electronic sensor according to an embodiment of the invention incorporating a fourth detection medium in response to an atmosphere of 5% hydrogen gas.

Referring now to FIG. 10, there is shown empirical data of corresponding to measuring a resistance signal response during the introduction of an atmosphere including 5% hydrogen gas into a baseline mixture of oxygen and nitrogen gases. In this way, the corresponding resistance signal response 1640 is shown including substantially the same features as the capacitance and impedance signal responses.

Hydrogen engages 1641 with the sensor providing a signal response. The signal response includes a first phase response 1651 in which the resistance decreases from a baseline of around 1900 ohms to at below 1600 ohms. The first phase response corresponds to a surface effect of the hydrogen on the sensor. The time for the first phase response to occur is less than 1 minute.

A second phase response 1652 is provided in which the resistance decreases at a second, in this case slower, rate to a first characteristic resistance of around 1150 ohms. The second phase response corresponds to a bulk effect of the hydrogen on the sensor. The time for the response is around 4 minutes.

The 5% hydrogen atmosphere is discontinued by introduction 1645 of an atmosphere of the baseline mixture of oxygen and nitrogen gases during testing. Discontinuation of the 5% hydrogen from the sensor provides a recovery signal response 1671.

Figure 11:
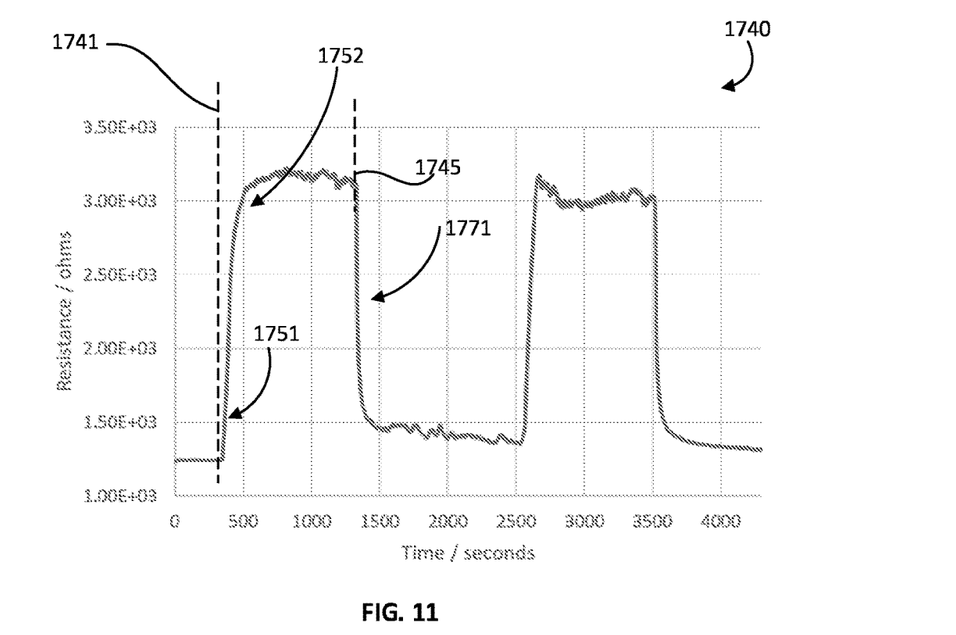
FIG. 11 shows empirical data of a resistance signal response of an electronic sensor according to an embodiment of the invention incorporating a fifth detection medium in response to an atmosphere of 2% hydrogen gas.

Referring now to FIG. 11, there is shown empirical data of corresponding to measuring a resistance signal response

1740 during the introduction of an atmosphere including 2% hydrogen gas. In this way, the corresponding resistance signal response is shown.

Hydrogen engages 1741 with the sensor providing a signal response. The signal response includes a first phase response 1751 in which the resistance increases from a baseline of around 1240 ohms to below 3000 ohms. The first phase response corresponds to a surface effect of the hydrogen on the sensor. The time for the first phase response to occur is approximately 30 seconds.

A second phase response 1752 is provided in which the resistance increases at a second, in this case slower, rate to a first characteristic resistance of around 3200 ohms. The second phase response corresponds to a bulk effect of the hydrogen on the sensor. The time for the response is around 2 minutes.

The 2% hydrogen atmosphere is discontinued by introduction 1745 of an atmosphere of the baseline mixture of oxygen and nitrogen gases during testing. Discontinuation of the 2% hydrogen from the sensor provides a recovery signal response 1771.

The skilled person would understand that various modifications can be made to the above described embodiments. In alternative embodiments, the capacitor material or detection material may completely fill the cavity. In certain embodiments, the capacitor material or detection material may overfill the cavity. That is, a surface of the capacitor material or detector material may be exposed above the groove.

Whilst the described embodiments have V-shaped grooves, the electronic devices are not limited to these shapes. In alternative embodiments, the grooves may U-shaped, asymmetrically V-shaped, rounded, semi-circular, or square shaped.

In certain embodiments, the substrate may differ from that described in the embodiments above. In particular, the number of layers in the insulating layer of the substrate and the composition may differ from the embodiments described above. The insulating layer may comprise one or more layers of insulating materials. For example, the electronic sensor device of FIG. 4 may comprise two layers of different materials in the insulating layer of the substrate.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An electronic sensor device comprising:
    at least one groove formed in a substrate, the at least one groove having a first face and a second face and a cavity therebetween;
    wherein the substrate comprises a layer of non-insulating material and a layer of insulating material, and the at least one groove extends through the layer of non-insulating material into the layer of insulating material so that the non-insulating material of the first and second faces are electrically separated from one another,
    wherein the layer of non-insulating material forms a portion of the first and second faces formed from the non-insulating material;
    wherein the first and second faces of the at least one groove are formed in the layer of non-insulating material and a base of the at least one groove is formed in the layer of insulating material;
    wherein the base of the at least one groove electrically separates the non-insulating material of the first face of the at least one groove from the non-insulating material of the second face of the at least one groove; and
    a detection medium provided within the at least one groove, arranged to contactingly engage the non-insulating material of the first and second faces, and adapted to be contactingly engaged by an analyte;
    wherein the at least one groove has a cross-sectional profile including at least a groove depth within the substrate and a groove width at a surface of the substrate; and
    wherein the cross-sectional profile or the detection medium is adapted such that, in use, a signal response is provided comprising a first response phase and a subsequent second response phase in response to an engagement of the analyte with the detection medium.

2. The electronic sensor device according to claim 1, wherein the at least one groove comprises a first groove and a second groove, and wherein a first face of the first groove is in electrical communication with a second face of the second groove.

3. The electronic sensor device according to claim 2, wherein the substrate comprises a layer of non-insulating material and a layer of insulating material and the at least one groove extends through the layer of non-insulating material into the layer of insulating material so that the non-insulating materials of the first and second faces are electrically separated from one another, and wherein the first and second grooves are adjacent, and the non-insulating layer forms the first face of the first groove and the second face of the second groove.

4. The electronic sensor device according to claim 1, wherein the detection medium comprises a medium surface and a medium body, and wherein the first response phase is provided in response to an engagement of the analyte with the medium surface.

5. The electronic sensor device according to claim 1, wherein the signal response comprises a change in at least one predetermined electrical characteristic of the at least one groove.

6. The electronic sensor device according to claim 5, wherein the predetermined electrical characteristic is an impedance, a resistance or a capacitance of the at least one groove.

7. The electronic sensor device according to claim 1, wherein the non-insulating material comprises a conductor material.

8. The electronic sensor device according to claim 1, wherein the non-insulating material comprises a semiconductor material.

9. The electronic sensor device according to claim 1, wherein the at least one groove is from 5 mm to 1000 mm long.

10. The electronic sensor device according to claim 1, wherein the first and second faces of the at least one groove have a depth from 100 nm to 10 µm.

11. The electronic sensor device according to claim 1, wherein the width of the at least one groove is less than or equal to 100 µm.

12. The electronic sensor device according to claim 11, wherein the width of the at least one groove is less than or equal to 40 µm.

13. The electronic sensor device according to claim 12, wherein the width of the at least one groove is within the range 0.5 µm to 10 µm.

14. The electronic sensor device according to claim 1, wherein a groove aspect ratio is defined as the ratio of the depth of the at least one groove to the width of the at least one groove, and wherein the groove aspect ratio is within the range 0.1:1 to 50:1.

15. A method of producing an electronic sensor device, the method comprising the steps of:
provided a substrate, the substrate comprising a layer of a non-insulating material and a layer of an insulating material; and
forming at least one groove into the substrate, the at least one groove having a first and a second face partially formed from the non-insulating material and a cavity between the first and second faces;
wherein forming the at least one groove into the substrate comprises forming the groove so that it extends through the layer of the non-insulating material into the layer of the insulating material, and the non-insulating material of the first and second faces are electrically separated from one another,
wherein the first and second faces of the at least one groove are formed in the layer of non-insulating material and a base of the at least one groove is formed in the layer of insulating material; and
wherein the base of the at least one groove electrically separates the non-insulating material of the first face of the at least one groove from the non-insulating material of the second face of the at least one groove,
providing a detection medium within the at least one groove, arranged to contactingly engage the non-insulating material of the first and second faces, and adapted to be contactingly engaged by an analyte;
wherein the at least one groove has a cross-sectional profile including at least a groove depth within the substrate and a groove width at a surface of the substrate; and
wherein the cross-sectional profile or the detection medium is adapted such that, in use, a signal response is provided comprising a first response phase and a subsequent second response phase in response to an engagement of the analyte with the detection medium.

16. The method according to claim 15, wherein the substrate comprises a non-insulating layer and an insulating layer and forming the at least one groove into the substrate comprises forming the groove so that it extends through the non-insulating layer into the insulating layer.

17. The method according to claim 15, comprising at least partially filling the cavity with a capacitor material.

* * * * *